Dec. 19, 1944.  F. R. LUDWELL  2,365,422
SUSPENSION MOUNTING FOR SAFETY HEADGEAR
Filed July 23, 1941
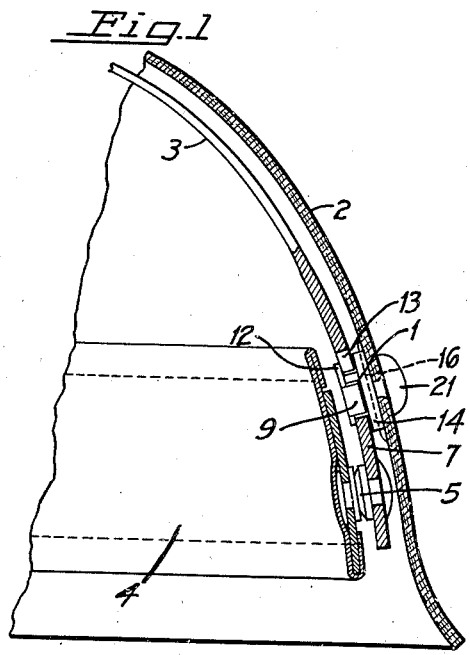
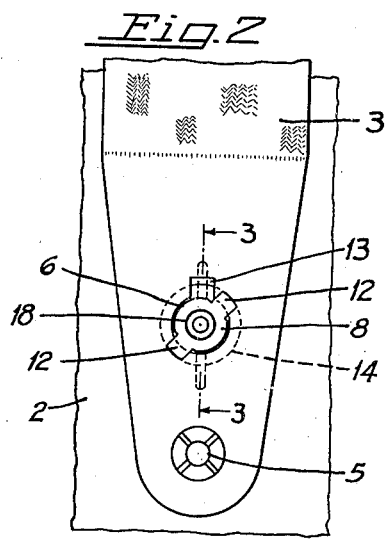
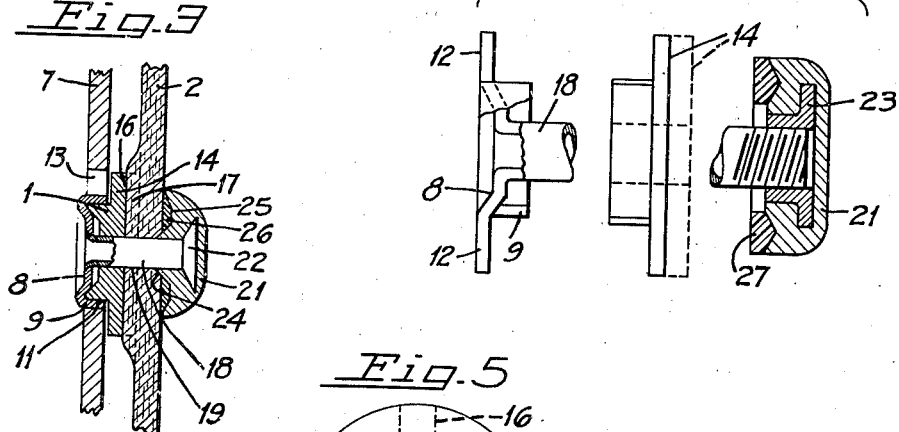
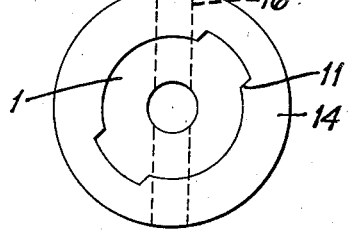
INVENTOR
FREDERICK R. LUDWELL
BY Charles S. Evans
ATTORNEY Patented Dec. 19, 1944

2,365,422

UNITED STATES PATENT OFFICE 2,365,422

SUSPENSION MOUNTING FOR SAFETY HEADGEAR

Frederick R. Ludwell, San Francisco, Calif., assignor to E. D. Bullard Company, San Francisco, Calif., a corporation of California Application July 23, 1941, Serial No. 403,630

8 Claims. (Cl. 2—3)

My invention relates to safety headgear, and particularly to improvements in a mounting for securing suspension straps and a sweat band within the crown of a safety hat, and for securing the strap engaging members to the hat crown.

It is among the objects of my invention to provide a suspension mounting secured within the crown portion of a safety hat in a manner adapted to insure effective electrical insulation, and a tight sealing of the openings in the crown through which the securing means extend.

Another object of my invention is to provide a mounting which will facilitate the mounting and replacement of the suspension straps and sweat band of a safety hat; and which will normally retain the straps in operative position and permit a limited rotative movement of the straps to conform to various head shapes.

Another object is to provide a suspension mounting having a spacing member which may be selected from any of a plurality of sizes for accommodating a safety hat of a single standard size to a wide range of head sizes; and which serves to position the mounting and suspension straps in a desired relation to the body of the hat for insuring efficiency and comfort.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

In the drawing:

Figure 1 is a fragmental sectional view of a portion of a safety hat and of a suspension strap and sweat band secured therein by means of the suspension mounting of my invention;

Figure 2 is a fragmental view showing, in front elevation, the lower end of the suspension strap and mounting of Figure 1;

Figure 3 is a sectional view taken upon the line 3—3 of Figure 2 in the direction indicated, the figure being drawn upon a larger scale;

Figure 4 is an exploded view of the members comprising the mounting, and illustrating a modified form of some of the parts, portions being shown in section; and Figure 5 is an elevational view of the bearing and spacing member, viewed from the left-hand side of the member, as shown in Figures 3 and 4.

In terms of broad inclusion, the suspension mounting of my invention comprises a member arranged to provide bearing engagement with a suspension strap within the crown of a safety hat. A retaining member is secured in fixed angular relation to the bearing member; and is provided with lateral extensions, for effecting retaining engagement with the suspension strap.

A spacer, preferably formed integrally with the bearing member, positions the bearing in spaced relation to the inner surface of the hat crown. The degree of spacing is varied to suit various ranges of head sizes by selecting a spacer of desired thickness from a variety of standard thicknesses provided for the purpose. The spacer is held against rotation and in fixed angular position, preferably by cooperating rib and groove means upon the engaging surfaces of the spacer and the crown.

The assembly of bearing, retaining member and spacer is attached to the crown by a securing member, such as a rivet, extending through the assembly and crown. A head formed of electrical insulating material, molded or otherwise secured to the outer end of the securing member, is arranged to seal the opening in the crown through which the securing member passes, and to insulate the securing member.

In terms of greater detail, the device of my invention comprises a bearing member, designated in general by the numeral 1, secured within the crown portion of a safety hat 2. The body or bearing portion of the member 1 provides a mounting for a suspension strap 3. A sweat band 4 is secured to the strap 3, preferably by a snap fastener 5. For purpose of illustration, I have shown a portion of a safety hat of the type disclosed in my copending applications Serial No. 299,999 filed October 15, 1939 (Patent No. 2,295,855, issued September 15, 1942), and No. 394,233 filed May 19, 1941. Such hats are formed of reinforced molded plastic materials which are electrically non-conductive. Each hat is provided with a plurality of straps 3, preferably four, mounted in the hat. The mounting device of the present invention may of course be applied advantageously to protective hats of other types, and of other materials.

The member 1 is preferably molded from thermo-setting or thermo-plastic material. A phenol-formaldehyde resin of the type known commercially as "impact resin" is preferred; but any of the plastic materials commonly used for molding, may be substituted. If desired, the member may be made wholly, or in part, of other materials such as metal, wood, leather, compressed fiber, or other suitable material.

One end of the member 1 is arranged to provide a bearing, fitting within an opening 6 formed in an extension 7 upon the lower end of a suspension strap 3. The extension 7 is preferably formed integrally with the strap 3, and is rendered relatively rigid by treatment with a thermo-setting or thermo-plastic material, as disclosed in my copending application Serial No. 394,233. However, if desired, the extension 7 may be formed as a separate element, and of other materials; and the strap 3 may be connected to the extension in any convenient manner.

A retaining member 8 is mounted upon the bearing portion of the member 1. Preferably the member 8 is formed of metal, and is provided with flanges 9 arranged to seat in recesses 11 in the sides of the bearing to give a smooth bearing surface. Laterally extending wings 12 positioned between the flanges 9 serve to retain the extension 7 in engagement with the bearing member 1. A slot 13, extending from one side of the opening 6, permits the extension 7 to be moved onto the bearing 1, when the slot is aligned with the wings 12. As illustrated in Figure 2 of the drawing, the slot 13 is of a depth sufficiently greater than the length of either wing 12 to clear the end of a wing when the opposite edge of the opening 6 is moved to the limit of its movement under the opposite wing 12, the extension being of a thickness or flexibility such as to permit the extension to be tilted or bent for movement under one wing 12 while the opposite edge rests against the outer face of the opposite wing 12. To remove an extension 7 from a bearing member 1, the operation is reversed, the slot 13 being moved outwardly over one of the wings 12; and, when it has cleared the wing, the extension being moved bodily from under the opposite wing 12. After movement onto the bearing member, the extension is turned to a normal position with the slot 13 out of alignment with the wings 12, which thereafter serve to normally hold the extension 7 on the bearing for pivotal movement thereon, as shown in Figures 1, 2 and 3.

A spacer 14 is positioned between the bearing portion of the member 1 and the crown 2 of the hat. Preferably the spacer is molded integrally with the bearing portion; but, if desired, the spacer may be formed separately, for mounting between the bearing member and the crown. The spacer 14 holds the strap extension 7 in spaced relation to the crown. Spacers of various standard thickness, ranging between limits of about $\frac{1}{16}''$ to $\frac{3}{8}''$, are provided for accommodating the hat to various ranges of head sizes, the range in thickness being indicated in dotted lines in Figure 4. To avoid undue distortion of the strap extension 7, when engaging a sweat band of small size, a thick spacer is employed. For the larger sizes of sweat band, one of the thinner spacers is selected; so that the lower end of the strap extension 7 will be in a position to receive the sweat band, without excessive distortion of either the extension or the sweat band.

The spacer 14 is preferably held in fixed angular position by means of a groove 16, arranged to engage a rib 17 upon the inside of the hat crown. The groove 16 is so positioned that, when seated upon the rib 17, the bearing member 1, and the wings 12 of the retaining member 8 carried thereby, will be held in a fixed position, for maintaining bearing engagement with the strap extension 7.

The bearing member 1 and spacer 14 are secured to the hat crown by a rivet 18, or other suitable securing member. The rivet 18 preferably comprises a stem extending through the assembled bearing member 1, retaining member 8 and spacer 14. The stem projects outwardly through an opening 19 in the crown 2.

A head 21 of insulating material, such as molded thermo-setting or thermoplastic material, is secured upon the outer end of the stem 18. Preferably the head 21 is molded onto an enlarged end 22 of the stem 18. Alternatively, the head 21 may be molded onto a nut 23 arranged to effect threaded engagement with the stem 18, as indicated in Figure 4 of the drawing. The molded head 21 is of a size and thickness sufficient to insure effective insulation of the outer end of the stem 18.

The head 21 is arranged to effect an insulating seal of the opening 19. For that purpose, I prefer to form a tapered projection 24 upon the inner end of the head around the stem. The opening 19 is counterbored to receive the projection 24. The projection affords increased bearing surface, and a tight seal of the opening. In addition, I prefer to provide a groove 25 surrounding the projection 24, and arranged to receive a suitable sealing material 26. The sealing material 26 may be any suitable calking compound; or it may be a gasket of rubber or other suitable material. A modified sealing arrangement is shown in Figure 4, wherein the projection 24 is omitted, and a relatively heavy gasket 27 is provided for effecting the desired seal.

The securing member 18 holds the mounting securely in place upon the inside of the crown; and permits the suspension straps 3 and sweat band 4 to be readily inserted and replaced as desired. Pivotal movement of the extension 7 upon the bearing member 1 permits the lower ends of the extensions to move sufficiently for the sweat band to shape itself to the head of the wearer, and thereby permit the hat to be worn with comfort.

I claim:

1. In safety headgear having a rigid crown portion and a head engaging suspension strap within the crown, a suspension strap mounting comprising a rivet stem extending through an opening in the crown, suspension strap engaging means upon the inner end of the stem, a head of dielectric material upon the outer end of the stem, a frustro-conical projection upon the inner face of the head concentric with the stem, and a groove surrounding the projection and arranged to receive an insulating sealing material.

2. In safety headgear having a crown and a suspension strap within the crown, a suspension strap mounting comprising a spacing member secured within the crown and having a body portion seating against the inner surface of the crown, and a bearing portion upon the body, a suspension strap-retaining member secured upon the bearing portion and engaging the suspension strap, said bearing portion being so constructed and arranged as to prevent rotation of the retaining member relative to the spacer.

3. In safety headgear having a crown and a suspension strap within the crown, a suspension strap mounting comprising a spacing member secured within the crown and having a body portion seating against the inner surface of the crown, a bearing portion upon the body, a suspension strap-retaining member secured upon the bearing portion and engaging the suspension strap, said bearing portion being so constructed and arranged as to prevent rotation of the retaining member relative to the spacer, and means for holding the spacer against rotation relative to the crown.

4. In safety headgear having a crown and a suspension strap within the crown, a suspension strap mounting comprising a spacing member secured within the crown and having a body portion seating against the inner surface of the crown, a bearing portion upon the body, a suspension strap-retaining member secured upon the bearing portion and engaging the suspension strap, said bearing portion being so constructed and arranged as to prevent rotation of the retaining member relative to the spacer, and interengaging rib and groove means upon the spacer and crown for holding the spacer against rotation relative to the crown.

5. In safety headgear having a crown and a suspension strap within the crown, a suspension strap mounting comprising a spacing member secured within the crown, a bearing portion positioned upon the inner side of the spacing member and provided with a recessed bearing surface for engaging the suspension strap, a suspension strap-retaining member provided with flange means seating in the recessed surface of the bearing portion with the outer surfaces of the flange means substantially flush with the bearing surface of the bearing portion, lateral extensions upon the retaining member for effecting retaining engagement with the suspension strap, and means for securing the spacing member in assembled relation upon the headgear.

6. In safety headgear having a crown and a suspension strap within the crown, a suspension strap mounting comprising a spacing member secured within the crown, a bearing portion positioned upon the inner side of the spacing member and provided with a recessed bearing surface for engaging the suspension strap, a suspension strap-retaining member provided with flanges seating in the recesses formed in the bearing portion with the outer surfaces of the flanges substantially flush with the bearing surface of the bearing portion, lateral extensions upon the retaining member for effecting retaining engagement with a suspension strap, a rivet extending through the spacing member bearing, retaining member and crown, and means for effecting an insulated seal at the outer end of the rivet.

7. In safety headgear having a rigid crown and head engaging straps within the crown, a suspension strap mounting for each suspension strap comprising a stem extending through an opening in the lower crown portion of the headgear, a head of dielectric material upon the outer end of the stem secured in sealing engagement with the opening, and a suspension strap-engaging member secured upon the inner end of the stem.

8. In safety headgear having a rigid crown portion having countersunk openings and head engaging suspension straps within the crown, a suspension strap mounting for each suspension strap comprising a rivet stem extending through one of the countersunk openings in the crown, suspension strap engaging means upon the inner end of the stem, a head of dielectric material upon the outer end of the stem, and a tapered projection upon the head for resealing the countersunk opening in the headgear through which the stem extends.

FREDERICK R. LUDWELL.